UNITED STATES PATENT OFFICE.

CHARLES REID BOGGS, OF ARLINGTON HEIGHTS, MASSACHUSETTS, ASSIGNOR TO SIMPLEX WIRE & CABLE CO., OF BOSTON, MASSACHUSETTS, A CORPORATION OF MASSACHUSETTS.

PROCESS FOR VULCANIZING RUBBER WITH SELENIUM OR ITS COMPOUNDS.

1,249,272. Specification of Letters Patent. Patented Dec. 4, 1917.

No Drawing. Application filed March 16, 1914. Serial No. 824,951.

*To all whom it may concern:*

Be it known that I, CHARLES REID BOGGS, a citizen of the United States, and resident of Arlington Heights, in the county of Middlesex and State of Massachusetts, have invented an improvement in Processes for Vulcanizing Rubber with Selenium or its Compounds, of which the following description is a specification.

In the vulcanization of rubber, it has heretofore been necessary to depend on sulfur or its compounds as an essential element to cause vulcanization of the rubber. However, I have discovered that rubber, such as reclaimed or regenerated rubber, or wild caoutchouc, may be vulcanized with selenium, or its compounds, and furthermore that the use of selenium results in an improved vulcanized product. In carrying out my invention, I prefer to employ selenium in the form of a powder, to mix with the rubber to be vulcanized, but I may use any of the selenium compounds, such for example as its chlorids, selenids, polyselenids, or the like, with good results. Also a mixture of any of these forms of selenium may be employed with sulfur compounds in carrying out my invention. My present process is equally capable of use for the production of either hard or soft vulcanized rubber, this being controlled entirely according to the amount of selenium used and the time and temperature employed. Furthermore I have discovered that the process of vulcanization with selenium or its compounds produces a greatly improved quality of product, the physical tests and the enduring qualities of the rubber being all materially increased.

While I may employ selenium or its compounds to vulcanize rubber, without the addition of an artificial accelerator, I prefer to utilize some accelerator, preferably such as is explained in my copending application Serial No. 824,950, filed Mar. 16, 1914, such accelerator consisting of the primary or secondary amins of the aliphatic or aromatic series or other ring structure, as therein explained.

In practice, I find that the following formula has proved to be especially practicable and commercially satisfactory, and is herein given for the purposes of illustration, it being understood that a wide variation from this example is within the scope of my invention. For example, one hundred parts of Hevea rubber are mixed with twenty-eight parts of selenium, four parts beta-naphthylamin, twenty-five parts litharge, four parts paraffin, and one hundred and thirty parts of zinc oxid and whiting, in suitable proportions and heated at 320 degrees F. for four hours. The time can be materially reduced with increase in temperature. I find that a suitable proportion for the whiting and zinc oxid is 80 parts of whiting to 50 parts of zinc, constituting a total of 130 parts, but as both these materials are inert agents, these proportions may be, of course, widely varied.

As above explained, the variation in the amount of selenium used and the time and temperature of the heat applied for vulcanizing will control the production of either hard or soft vulcanized rubber, as will be readily understood by those skilled in the art. The resulting product is a new article of manufacture, and being a direct production of my selenium process, I wish to claim both the process and the resulting article.

Having described my invention, what I claim as new and desire to secure by Letters Patent is:

The process of vulcanizing rubber and rubber mixtures, which comprises incorporating with the rubber a quantity of selenium or its compounds prior to or during vulcanization, together with an artificial accelerator, such as beta-naphthylamin.

In testimony whereof, I have signed my name to this specification, in the presence of two subscribing witnesses.

CHARLES REID BOGGS.

Witnesses:
HENRY WAITE BIGELOW,
AGNES BERNICE GRIFFIN.